United States Patent
Haess et al.

(10) Patent No.: US 7,085,865 B2
(45) Date of Patent: Aug. 1, 2006

(54) I/O THROUGHPUT BY PRE-TERMINATION ARBITRATION

(75) Inventors: Juergen Haess, Schoenaich (DE); Ingemar Holm, Stuttgart (DE); Hartmut Ulland, Altdorf (DE); Gerhard Zilles, Jettingen (DE)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 10/895,654

(22) Filed: Jul. 21, 2004

(65) Prior Publication Data
US 2005/0060454 A1    Mar. 17, 2005

(30) Foreign Application Priority Data
Aug. 21, 2003  (EP)  .................. 03102620

(51) Int. Cl.
G06F 13/36 (2006.01)
G06F 13/40 (2006.01)
G06F 13/20 (2006.01)
G06F 13/28 (2006.01)

(52) U.S. Cl. ............ 710/113; 710/107; 710/306; 710/307; 713/202; 713/501

(58) Field of Classification Search ............ 710/4, 710/5, 18, 107, 240, 106, 116, 113, 309, 306, 710/307; 370/229, 431, 912; 714/47, 712, 714/37, 39; 700/90; 712/1; 713/202, 501
See application file for complete search history.

(56) References Cited

U.S. PATENT DOCUMENTS

| | | | | |
|---|---|---|---|---|
| 4,761,807 A | * | 8/1988 | Matthews et al. | 379/88.26 |
| 5,255,373 A | | 10/1993 | Brockmann et al. | 395/325 |
| 5,426,741 A | * | 6/1995 | Butts et al. | 710/18 |
| 5,579,492 A | * | 11/1996 | Gay | 710/110 |
| 5,638,528 A | * | 6/1997 | Gay et al. | 711/217 |
| 5,805,590 A | * | 9/1998 | Gillard et al. | 370/395.4 |
| 5,862,315 A | * | 1/1999 | Glaser et al. | 714/11 |
| 5,898,815 A | * | 4/1999 | Bluhm et al. | 710/45 |
| 5,919,268 A | * | 7/1999 | McDonald | 714/47 |
| 5,970,226 A | * | 10/1999 | Hoy et al. | 714/25 |
| 6,061,809 A | * | 5/2000 | Glaser et al. | 714/11 |
| 6,094,692 A | | 7/2000 | Kalkunte | 710/34 |
| 6,199,132 B1 | * | 3/2001 | Hewitt et al. | 710/107 |
| 6,292,491 B1 | * | 9/2001 | Sharper | 370/412 |

OTHER PUBLICATIONS

"An easy-to-use approach for practical bus-based system design" by Chen et al. (abstract only) Publication Date: Aug. 1999.*

* cited by examiner

Primary Examiner—Gopal C. Ray
(74) Attorney, Agent, or Firm—John E. Campbell

(57) ABSTRACT

The invention provides a method of transmitting data via a bus system coupling a plurality of bus participants with an arbitration procedure for the plurality of bus participants. The invention further enables bus arbitration during a first transmission since that the bus can be granted for a second transmission following the first transmission without wasting bus cycles. This is accomplished by determining the number of cycles remaining for the first transmission according to memory boundary and transmission packet boundary conditions.

20 Claims, 4 Drawing Sheets

I/O THROUGHPUT BY PRE-TERMINATION ARBITRATION

FIELD OF THE INVENTION

The present invention relates to field of arbitration methods for interruptionless utilization of a data transmission system, such as an arbitrary data bus, a bus bridge or a network controller.

BACKGROUND OF THE INVENTION

Various computer components request access to a common communication platform in order to share the usage of various peripheral devices or memory. The common communication platform is typically provided by a bus system for data transfer operations. When several components (hereinafter referred to as participants) request grant to the bus system simultaneously, an arbitration procedure determines which of the requesting participants receives grant to the bus.

A simple arbitration procedure can be realised with a round robin arbitration algorithm, in which the participants receive grant to the bus in a fixed cyclic order. This algorithm has the disadvantage, that access to the bus is granted irrespectively from the fact whether a participant requested for access or not. Thus, the idle time of the bus can increase to a large number of bus cycles.

Another common arbitration procedure is based on priority scheduling. Here, each data transfer operation is assigned with a distinct priority label. Depending on this priority label, which may be static or dynamic, the corresponding participant receives grant to the bus. A danger of priority scheduling is starvation, in which operations with low priority are not given the opportunity to receive a grant.

Various improvements and modifications under round robin and the priority algorithm have been made and implemented, in order to optimize the arbitration procedure. Nevertheless, most arbitration procedures have the disadvantage that the arbitration of a participant needs a certain amount of bus cycles.

In U.S. Pat. No. 5,255,373 a method to eliminate the arbitration delay when the system bus is idle is suggested. Furthermore, it describes a system which detects when a system bus is idle and which keeps the system bus in an arbitration state. Therefore, each participant detects autonomously whether the bus is idle or not.

When the bus is idle, it is kept in an arbitration state, to allow a subsequent arbitration to take place immediately. A disadvantage of this invention is, that all data transfer operations have to be equal in size. Therefore, various data transfer operations that are different in size cannot be processed in an effective way with this invention.

U.S. Pat. No. 6,094,692 describes a method to minimize the transmit underflow and packet latency of data packets transmitted between a host computer and a network. Here, the byte length of each received packet is determined and the time needed to fill a FIFO buffer is measured. Furthermore, the output transmission rate of the FIFO buffer is determined. Depending on the byte length of each received packet, the output transmission rate and the fill time for the FIFO buffer, a transmit start point is set. In particular when the output transmission rate is larger than the input transmission rate of the FIFO buffer, the transmit start point is delayed in order to prevent transmit underflow. The method comprises the calculation of the removal and the fill time of the FIFO buffer, but it does not include any kind of arbitration procedure.

The present invention aims to provide an improved arbitration method and arbitration apparatus for the interruptionless utilization of a bus transmitting data between a plurality of participants.

SUMMARY OF THE INVENTION

The present invention provides an improved method for an arbitration procedure for continuous utilization of a bus transmitting data between a plurality of participants. A distinct arbitration time which is needed by an arbitration unit to arbitrate one of the pluralities of participants is given by an amount of bus cycles. When a participant receives grant from an arbitration unit it starts to transmit a command over the bus. Preferably, this command either belongs to a transfer operation or to a Direct Memory Access (DMA) operation. The command is analyzed by a timing module, which determines the size of the data transfer or the DMA operation, hence the number of cycles needed for processing the entire operation.

The timing module initiates a timer with a start value being equal to the number of cycles needed to process the entire operation. A predefined threshold value of the timer equals the number of cycles needed by the arbitration procedure. When the timer has reached this predefined threshold value, the timing module activates the arbitration unit which starts immediately with the arbitration of a subsequent operation. Consequently, the transmission of the subsequent operation immediately starts after the last transfer cycle of the first data transfer operation has been processed. In this way the generation of a gap in the operation stream is effectively prevented and the bus can be used in its most effective hence interruptionless way. In accordance with a preferred embodiment of the invention the arbitration of a subsequent data transfer operation takes place even before the actual operation has been processed.

In accordance with a further preferred embodiment of the invention, the plurality of bus participants can receive or transmit data transfer or DMA operations. The operations further consist of a command and a data packet of variable size. The command contains information about the size of the data packet and the address of the data packet.

In accordance with a further preferred embodiment of the invention, the bus is connected via a bridge module to a second bus which is connected to a memory module. The first and the second bus are characterised by the same data transfer rate. Thus, the clock frequency and the width of the first bus may differ from the clock frequency and the width of the second bus, as long as the product of clock frequency and width of the bus is equal for each bus.

In accordance with a further preferred embodiment of the invention a safety gap is generated between successive operations in the operation stream to eliminate potential driving conflicts. Therefore, a safety margin is subtracted from the threshold value of the timer. Since the threshold value is now decreased, the arbitration of a successive operation is delayed by a number of cycles that correspond to the safety margin.

In accordance with a further preferred embodiment of the invention the timer value which is equal to the number of cycles needed to process an operation is determined by the timing module by taking into account the size of the DMA operation, the width of the system bus to which the DMA operation has been transmitted by a participant and a start address inside a memory module which is connected to a second bus, which in turn is connected to the first bus via a bridge module. The memory module is divided in memory blocks each containing a certain number of bytes. The timer value is calculated by the timing module depending on whether the start address matches the first byte of a memory block inside the memory module and whether the size of the data packet can be divided by the width of the bus without rest.

The present invention is particularly advantageous for eliminating gaps in a data or operation stream that are due to an arbitration procedure. The method of the present invention is not restricted to a distinct arbitration procedure. Moreover, it can be applied to numerous bus systems and arbitration procedures, such as priority decoded and/or round robin procedures. Furthermore, the invention is not restricted to computer systems, but can universally be applied to bus bridges, network controllers and any other device requiring an arbitration procedure in the framework of modern communication systems.

BRIEF DESCRIPTION OF THE DRAWINGS

In the following, preferred embodiments of the invention will be described in greater detail by making reference to the drawings in which.

DETAILED DESCRIPTION

Figure 1:
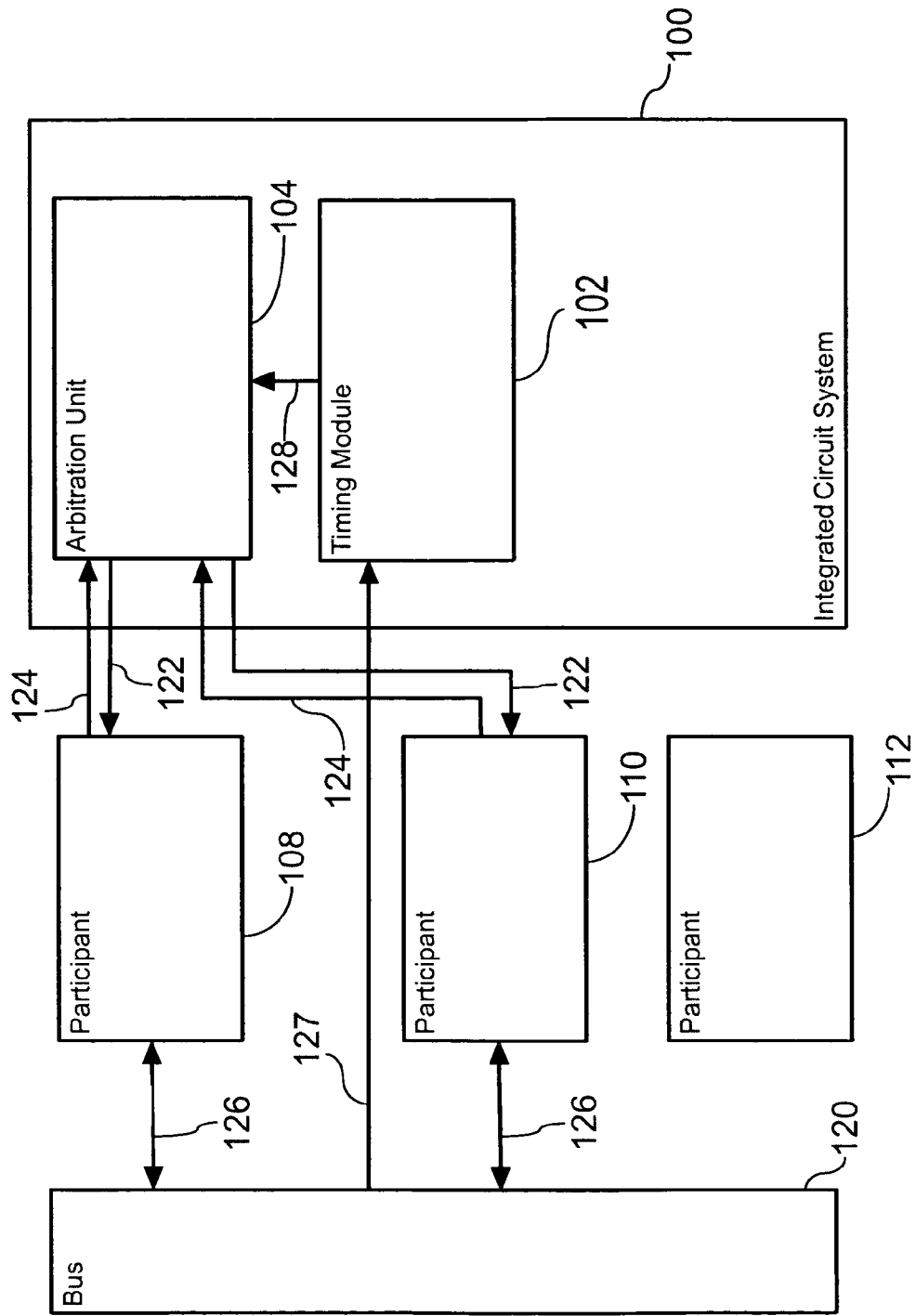
FIG. 1 shows a block diagram of a bus system and an arbitration system.

FIG. 1 schematically shows an integrated circuit system 100, that contains a timing module 102 and an arbitration unit 104. Furthermore, it shows three mutually independent participants 108, 110 and 112, that are each connected to a bus 120 via a data connection 126. Each participant 108, 110 and 112 is independently connected to the arbitration unit via a request line 122 and a grant line 124. The timing module 102 is connected with the bus 120 with a connection 127 and with a line 128 to the arbitration unit 104.

The participant 108 wishing to transmit a data transfer operation to the bus 120 sends a request to the arbitration unit 104 via the request line 122. The request line 122 is two bits wide which allows for three different priorities of the data transfer operation. When access to the bus is granted by the arbitration unit 104 a grant is passed to the participant 108 via the grant line 124, which is one bit wide. The participant 108 then starts to transmit the data transfer operation to the system bus 120 via the data connection 126, which is four byte wide. As soon as the transmission of the data transfer operation has been started, the command of the operation is detected by the timing module 102 via the connection 127.

From the information given by the command of the data transfer operation the timing module 102 calculates the number of bus cycles needed in order to process the transmission of the operation from the participant 108 to the system bus 120. It initiates a timer with a start value being equal to the number of cycles needed for the entire transmission. The timer value is decremented step wise with each bus cycle. When the timer has reached a predefined threshold value it activates the arbitration unit via the line 128 and the arbitration of another participant begins. A threshold value is chosen in such a way that it equals the number of bus cycles needed by an arbitration procedure including the initialization for sending of the next data transfer operation. In this way, a successive operation can be arbitrated while the actual operation is still being processed and an interruptionless operation stream can be generated on the bus.

In a further embodiment, the threshold value is modified in order to generate a gap in the operation stream on the bus between successive operations. The size of the safety gap is chosen arbitrarily and it may consist of one or more bus cycles.

Figure 2:
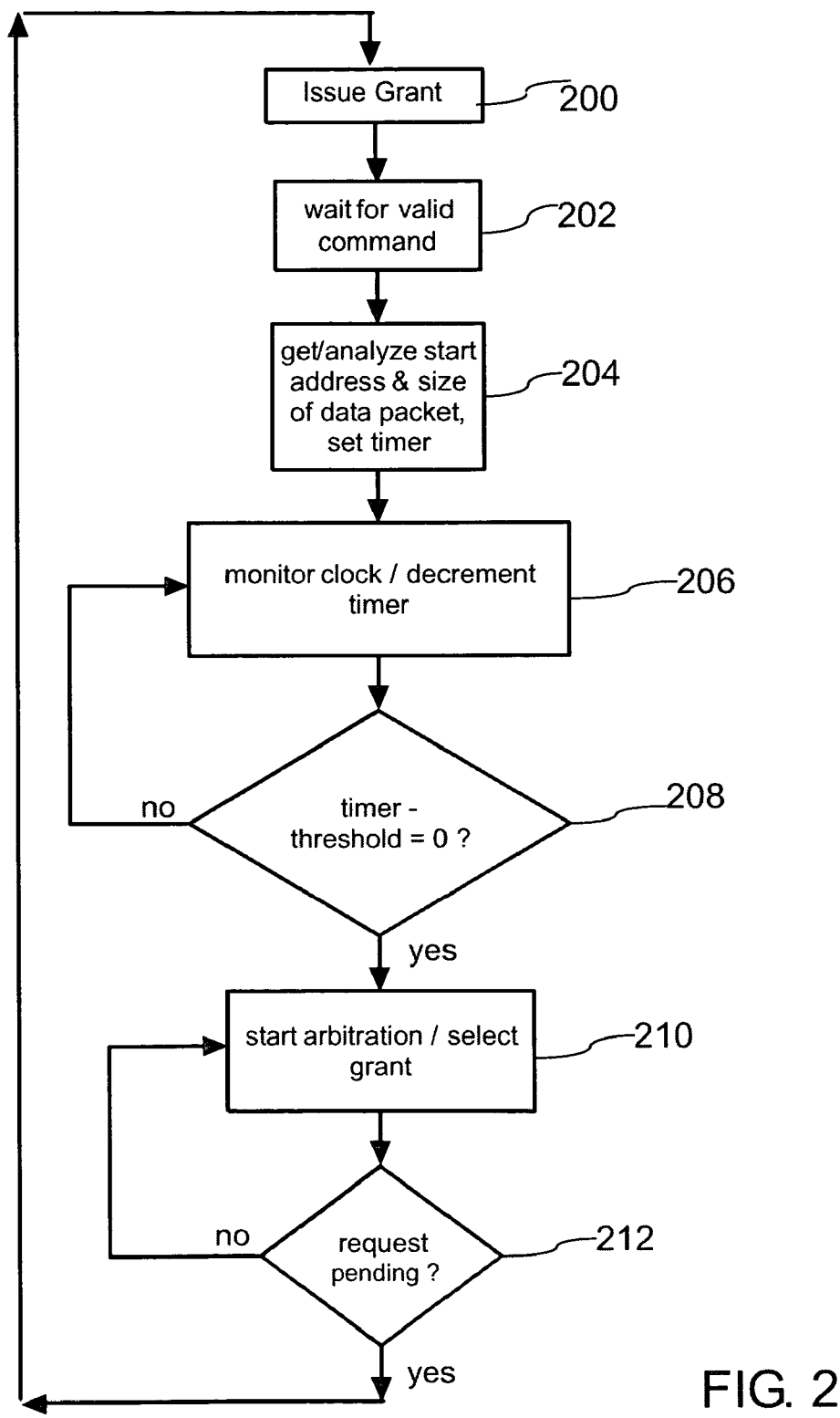
FIG. 2 is illustrative of a flow chart for performing a method of the invention.

FIG. 2 illustrates a corresponding flow chart. In step 200 a grant is issued to a participant. In step 202 the timing module is waiting for a valid data transfer operation to be transmitted onto the bus. When the command of the operation has been transmitted to the bus it is analyzed in step 204. Furthermore depending on the start address and the size of the data packet a start value of the timer is determined. In step 206 the clock of the bus is monitored and with each bus cycle the timer is decremented.

Step 208 checks whether the timer has reached the predefined threshold value. If the threshold value has not yet been reached, the procedure returns to step 206. If in step 208 the threshold value has been reached then in step 210 the next arbitration is started. Then step 212 checks whether another request is pending. If there is no other request pending, the method continues with step 210. If in step 212 another request is pending then the method continues with step 200 and issues a new grant to a new participant.

Figure 3:
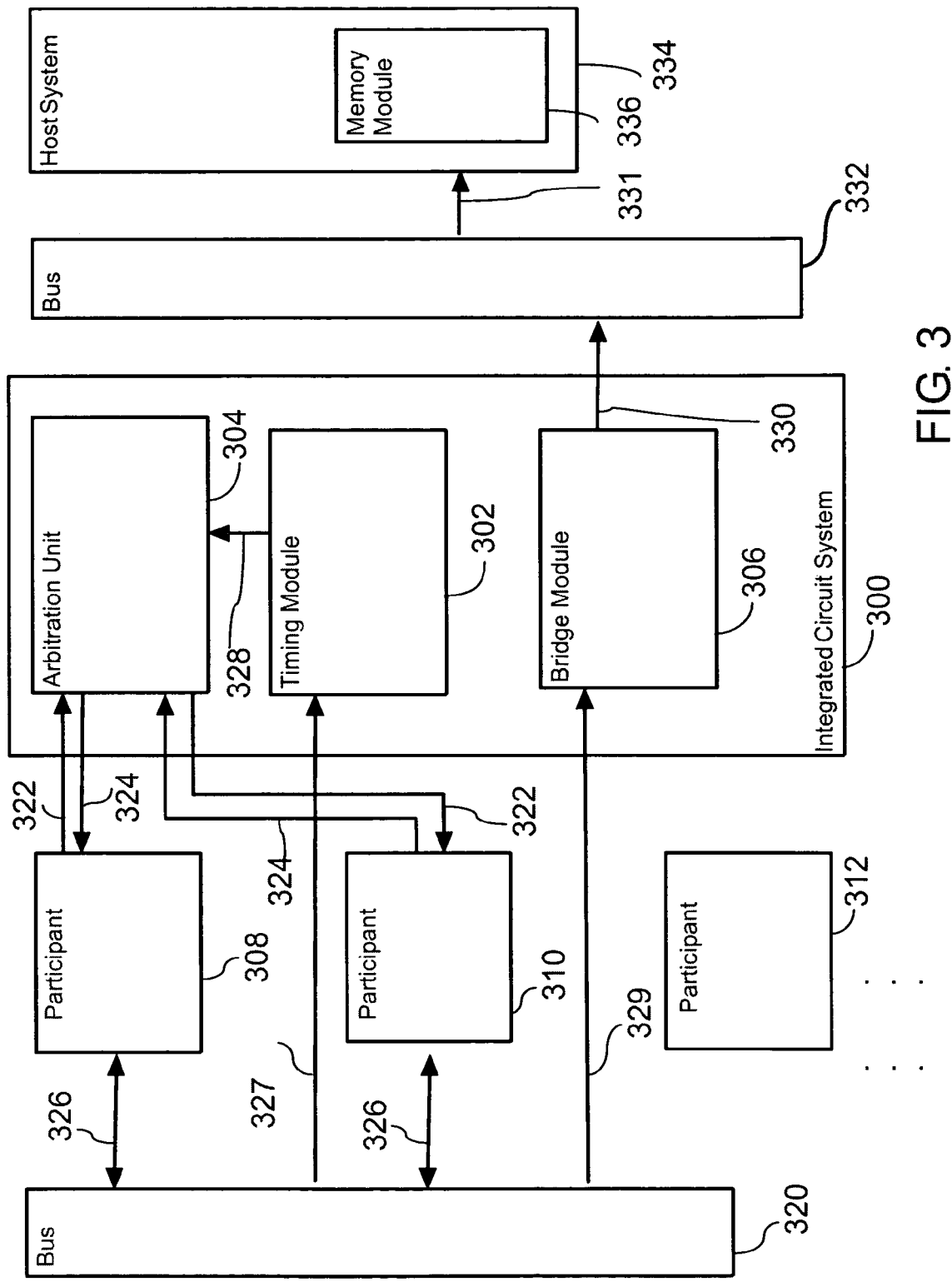
FIG. 3 shows a block diagram of a preferred embodiment of the invention.

FIG. 3 schematically shows a further embodiment of the invention illustrated in FIG. 1. It shows an integrated circuit system 300 consisting of a timing module 302 an arbitration unit 304 and a bridge module 306. It further illustrates three mutually independent participants 308, 310 and 312. The figure further depicts a first bus 320, a second bus 332 and a host system 334 that contains a memory module 336. Every single participant 308, 310 and 312 is connected to the first bus 320 via a data connection 326. Furthermore, every participant 308, 310 and 312 is independently connected to the arbitration unit 304 via a request line 322 and a grant line 324. The timing module 302 is connected to the first bus 320 via a connection 327 and it is connected to the arbitration unit 304 via a line 328. The bridge module 306 is connected to the first bus 320 via a data connection 329 and it is also connected to the second bus 332 via a data connection 330. The memory module 336 located inside a host system 334 is connected to the second bus 332 via a data connection 331.

The timing module 302, the arbitration unit, the single participants 308, 310 and 312, as well as the first bus 320 have the same function as the corresponding modules depicted in FIG. 1. In the present embodiment of the invention, the bridge module 306 connects the first bus 320 to the second bus 332. Here, the two busses can differ in clock frequency and bus width, as long as their data transfer rates are equal. In a preferred embodiment of the invention the width of the bus 320 is four byte and the width of the second bus 332 is one byte. As a consequence, the clock frequency of the second bus 332 is four times larger than the clock frequency of the first bus 320. The corresponding data connections 329 and 330, 331 have a width of four byte and one byte, respectively. The memory module 336 contains memory blocks with a size of a multiple of four byte.

If one of the participants 308, 310 or 312 wants to transmit a DMA operation via the bus 320, it sends a request to the arbitration unit 304 via the request line 322. Transmission of the operation begins when the participant 308 receives grant from the arbitration unit 304 via the grant line 324, the timing module 302 detects the beginning of a transmission via the connection 327 and determines the number of cycles needed for processing the DMA operation. The timing module 302 activates the arbitration unit 304 when the decremented timer equals the predefined threshold value.

The arbitration unit 304 arbitrates for the next participant 310 or 312 requesting access to the bus 320. The operation stream on the bus 320 is directed to the bridge module 306 via the data connection 329. The bridge module converts the four byte wide DMA operation to a one byte wide DMA operation and passes this one byte wide DMA operation to the bus 332 via the data connection 330. The bus 332, which is characterised by a four times larger clock frequency than bus 320 passes the DMA operation to the memory module 336 via the data connection 331.

Figure 4:
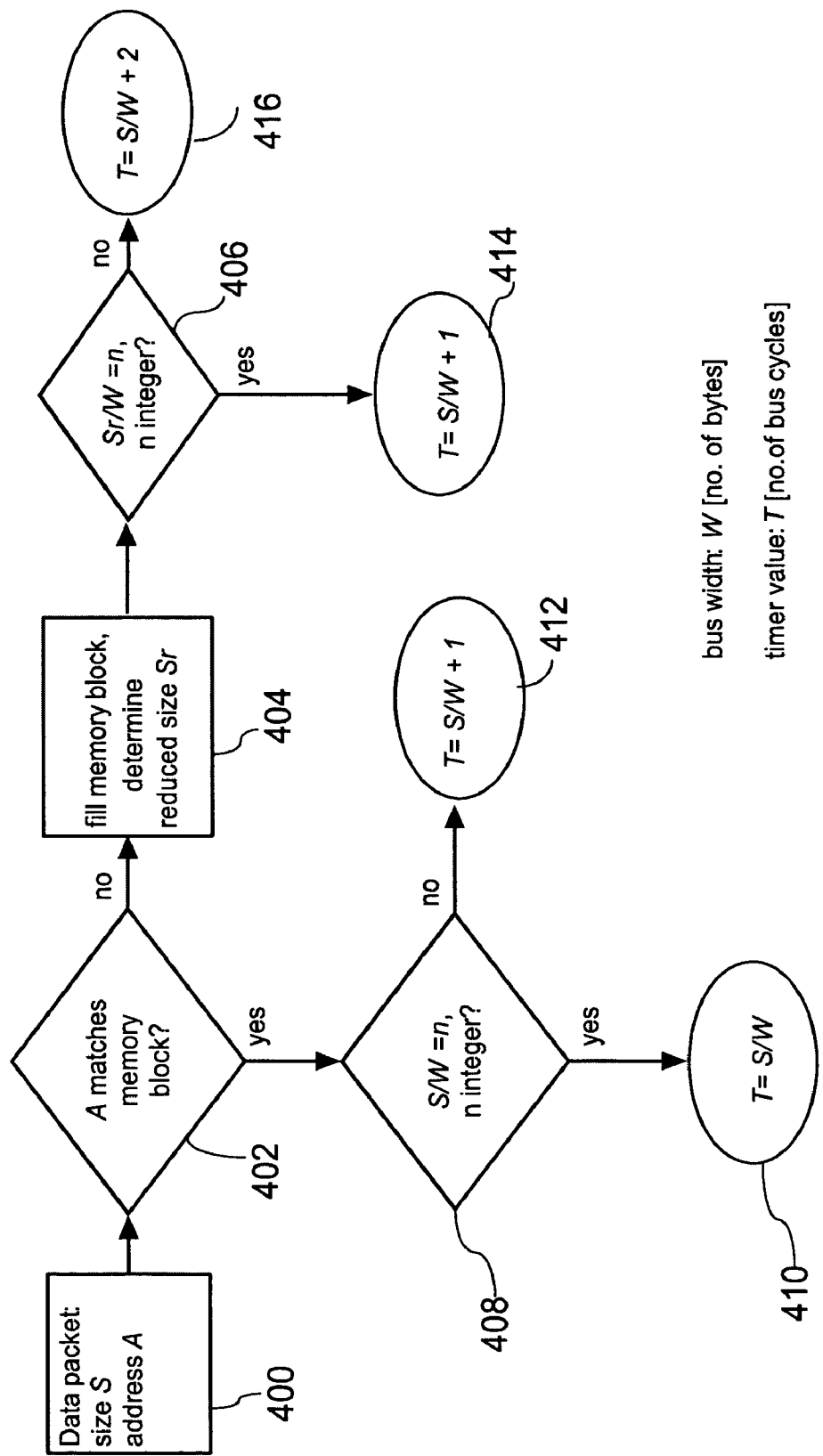
FIG. 4 is illustrative of a flow chart for calculating the timer value.

FIG. 4 shows a corresponding flow chart for the calculation of the timer value T for a given size S and a given address A of the data packet. The width of the bus W is given in number of bytes and the timer value T is given in number of bus cycles. The address A of a data packet is compared to the starting address of the memory blocks in steps 402.

If A matches the starting address of a memory block in step 402 then in step 408 the size of a data packet S is divided by the width of a system bus W.

If the division can be performed without rest, then the timer value is given by the ratio of S and W. If the division in step 408 cannot be performed without rest the timer value T is given by the ratio of S divided by W and incremented by one.

When in step 402 the address A of a data packet does not match the start address of a memory block then in step 404 a reduced size of the data packet SR is determined. The reduced size SR is obtained by subtracting the difference of the start address of the next memory block and the start address of the data packet A from the size S of the data packet.

Then in step 406 the reduced size SR is divided by the width of the bus W. If the division in step 406 can be performed without rest then in step 414 the timer value is given by the ratio of SR and W and incremented by one.

If the division in step 406 cannot be performed without rest, the timer value is given in step 416 by the ratio of SR and W and incremented by two.

LIST OF REFERENCE NUMBERS 100 integrated circuit system
102 timing module
104 arbitration unit
108 participant
110 participant
112 participant
120 bus
122 request line
124 grant line
126 data connection
127 connection
128 line
300 integrated circuit system
302 timing module
304 arbitration unit
306 bridge module
308 participant
310 participant
312 participant
320 bus
322 request line
324 grant line
326 data connection
327 connection
328 line
329 data connection
330 data connection
331 data connection
332 bus
334 host system
336 memory module While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A method for arbitrating for access to a bus in a bus system having a plurality of bus participants, the bus participants connected to the bus, the method comprising the steps of:
  granting access to the bus to a first one of the plurality of bus participants;
  receiving a first portion of a first data transmission from a first participant of flow plurality of bus participants;
  determining from the first portion of the first data transmission, the number of bus cycles required to receive the first data transmission;
  maintaining a counter value representing the number of bus cycles remaining for the first data transmission to complete; and
  initiating an arbitration process for granting access to the bus when the counter value reaches a first predetermined value.

2. The method according to claim 1 comprising the further steps of:
  granting access to the bus to a second one of the plurality of bus participants during the first data transmission from the first participant; and
  receiving a last bus cycle of the first data transmission;
  then, receiving the first bus cycle of a second data transmission wherein there are a second predetermined number of null bus cycles between the last bus cycle of the first data transmission and the first bus cycle of the second day that transmission wherein the second predetermined number of null bus cycles is any one of 0, 1 or 2 bus cycles.

3. The method according to claim 1 wherein the determining step further comprises: calculating the number of bus cycles required to receive the first data transmission based on a first data packet size of the first data transmission and a start address for an external memory unit both included in the operation.

4. The method according to claim 1 wherein the plurality of bus participants is connected to a first bus with a first bus width and a first clock frequency, which is connected via a bridge module to a second bus with a second bus width and a second clock frequency, such that the product of the first bus width and first clock frequency equals the product of the second bus width and the second bus frequency.

5. The method according to claim 4 wherein the width of the first bus is given by a first number of bytes and the second bus is connected to a memory system with memory blocks each having a second number of bytes, comprising any one of the following steps A), B) or C):
- A) if the size of a first data packet of the first data transmission can be divided evenly by the first number of bytes and further if the start address of the first data packet matches the start address of a memory block, then setting the counter value according to the size of the first data packet divided by the first number of bytes;
- B) if the start address of the first data packet matches the start address of a memory block and further, if the size of a first data packet cannot be divided evenly by the first number of bytes, then calculating a new counter value by dividing the size of the first data packet by the first number of bytes and incrementing the result by one, then setting the counter value according to the new counter value; or
- C) if the start address of the first data packet does not match the start address of a memory block then calculating a reduced size of the first data packet by subtracting the difference of the next memory block and the start address of the first data packet from the size first the data packet then:
  - a) if the reduced size of the first data packet can be divided evenly by the first number of bytes, then calculating a new counter value by dividing the size of the first data packet by the first number of bytes and incrementing the result by one, then setting then setting the counter value according to the new counter value; and
  - b) if the reduced size of the data packet cannot be divided evenly by the first number of bytes, then calculating a new counter value by dividing the size of the first data packet by the first number of bytes and incrementing the result by two, then setting the counter value according to the new counter value.

6. The method according to claim 5 wherein any one of the first number of bytes or the second number of bytes is 4 bytes.

7. The method according to claim 1 further comprising: adding a safety margin to the first predetermined value in order to generate a safety gap between successive transmissions.

8. A computer program product for arbitrating for access to a bus in a bus system having a plurality of bus participants, the bus participants connected to the bus, the computer program product comprising:
- a storage medium readable by a processing circuit and storing instructions for execution by the processing circuit for performing a method comprising:
- granting access to the bus to a first one of the plurality of bus participants;
- receiving a first portion of a first data transmission from a first participant of flow plurality of bus participants;
- determining from the first portion of the first data transmission, the number of bus cycles required to receive the first data transmission;
- maintaining a counter value representing the number of bus cycles remaining for the first data transmission to complete; and
- initiating an arbitration process for granting access to the bus when the counter value reaches a first predetermined value.

9. The computer program product according to claim 8 comprising the further steps of:
- granting access to the bus to a second one of the plurality of bus participants during the first data transmission from the first participant; and
- receiving a last bus cycle of the first data transmission;
- then, receiving the first bus cycle of a second data transmission wherein there are a second predetermined number of null bus cycles between the last bus cycle of the first data transmission and the first bus cycle of the second day that transmission wherein the second predetermined number of null bus cycles is any one of 0, 1 or 2 bus cycles.

10. The computer program product according to claim 8 wherein the determining step further comprises: calculating the number of bus cycles required to receive the first data transmission based on a first data packet size of the first data transmission and a start address for an external memory unit both included in the operation.

11. The computer program product according to claim 8 wherein the plurality of bus participants is connected to a first bus with a first bus width and a first clock frequency, which is connected via a bridge module to a second bus with a second bus width and a second clock frequency, such that the product of the first bus width and first clock frequency equals the product of the second bus width and the second bus frequency.

12. The computer program product according to claim 11 wherein the width of the first bus is given by a first number of bytes and the second bus is connected to a memory system with memory blocks each having a second number of bytes, comprising any one of the following steps A), B) or C):
- A) if the size of a first data packet of the first data transmission can be divided evenly by the first number of bytes and further if the start address of the first data packet matches the start address of a memory block, then setting the counter value according to the size of the first data packet divided by the first number of bytes;
- B) if the start address of the first data packet matches the start address of a memory block and further, if the size of a first data packet cannot be divided evenly by the first number of bytes, then calculating a new counter value by dividing the size of the first data packet by the first number of bytes and incrementing the result by one, then setting the counter value according to the new counter value; or
- C) if the start address of the first data packet does not match the start address of a memory block then calculating a reduced size of the first data packet by subtracting the difference of the next memory block and the start address of the first data packet from the size first the data packet then:
  - a) if the reduced size of the first data packet can be divided evenly by the first number of bytes, then calculating a new counter value by dividing the size of the first data packet by the first number of bytes and incrementing the result by one, then setting the counter value according to the new counter value; and
  - b) if the reduced size of the data packet cannot be divided evenly by the first number of bytes, then calculating a new counter value by dividing the size of the first data packet by the first number of bytes and incrementing the result by two, then setting the counter value according to the new counter value.

13. The computer program product according to claim 12 wherein any one of the first number of bytes or the second number of bytes is 4 bytes.

14. The computer program product according to claim 8 further comprising: adding a safety margin to the first predetermined value in order to generate a safety gap between successive transmissions.

15. A system for arbitrating for access to a bus in a bus system the system comprising:
   a bus;
   a plurality of bus participants connected to the bus;
   an arbitrator for granting bus participant access to the bus wherein the system includes instructions to execute a method comprising;
   authenticating the identity of a first client;
   granting access to the bus to a first one of the plurality of bus participants;
   receiving a first portion of a first data transmission from a first participant of flow plurality of bus participants;
   determining from the first portion of the first data transmission, the number of bus cycles required to receive the first data transmission;
   maintaining a counter value representing the number of bus cycles remaining for the first data transmission to complete; and
   initiating an arbitration process for granting access to the bus when the counter value reaches a first predetermined value.

16. The system according to claim 15 comprising the further steps of:
   granting access to the bus to a second one of the plurality of bus participants during the first data transmission from the first participant; and
   receiving a last bus cycle of the first data transmission;
   then, receiving the first bus cycle of a second data transmission wherein there are a second predetermined number of null bus cycles between the last bus cycle of the first data transmission and the first bus cycle of the second day that transmission wherein the second predetermined number of null bus cycles is any one of 0, 1 or 2 bus cycles.

17. The system according to claim 15 wherein the determining step further comprises: calculating the number of bus cycles required to receive the first data transmission based on a first data packet size of the first data transmission and a start address for an external memory unit both included in the operation.

18. The system according to claim 15 wherein the plurality of bus participants is connected to a first bus with a first bus width and a first clock frequency, which is connected via a bridge module to a second bus with a second bus width and a second clock frequency, such that the product of the first bus width and first clock frequency equals the product of the second bus width and the second bus frequency.

19. The system according to claim 18 wherein the width of the first bus is given by a first number of bytes and the second bus is connected to a memory system with memory blocks each having a second number of bytes, comprising any one of the following steps A), B) or C):
   A) if the size of a first data packet of the first data transmission can be divided evenly by the first number of bytes and further if the start address of the first data packet matches the start address of a memory block, then setting the counter value according to the size of the first data packet divided by the first number of bytes;
   B) if the start address of the first data packet matches the start address of a memory block and further, if the size of a first data packet cannot be divided evenly by the first number of bytes, then calculating a new counter value by dividing the size of the first data packet by the first number of bytes and incrementing the result by one, then setting the counter value according to the new counter value; or
   C) if the start address of the first data packet does not match the start address of a memory block then calculating a reduced size of the first data packet by subtracting the difference of the next memory block and the start address of the first data packet from the size first the data packet then:
   a) if the reduced size of the first data packet can be divided evenly by the first number of bytes, then calculating a new counter value by dividing the size of the first data packet by the first number of bytes and incrementing the result by one, then setting the counter value according to the new counter value; and
   b) if the reduced size of the data packet cannot be divided evenly by the first number of bytes, then calculating a new counter value by dividing the size of the first data packet by the first number of bytes and incrementing the result by two, then setting the counter value according to the new counter value.

20. The system according to claim 15 further comprising: adding a safety margin to the first predetermined value in order to generate a safety gap between successive transmissions.

* * * * *